UNITED STATES PATENT OFFICE 2,500,855

ALIPHATIC ESTERS OF 3,4-BIS-(m-METHYL-p-HYDROXYPHENYL) HEXANES

Victor Niederl, Round Top, N. Y., and Albert Bloom, Summit, N. J., assignors to Reed & Carnrick, Jersey City, N. J., a corporation of New Jersey No Drawing. Application December 17, 1946, Serial No. 716,883

4 Claims. (Cl. 260—479)

1

The present invention relates to certain esters of dialkyldihydroxydiphenylhexane wherein the acid radical contains 2–4 carbon atoms.

More specifically, the present invention relates to saturated aliphatic carboxylic acid esters of 3,4-bis-(m - methyl - p - hydroxyphenyl) hexane containing 2–4 carbon atoms in the carboxylic acid radicals.

This application is a continuation-in-part of applications Serial Nos. 524,090, filed February 26, 1944, now Patent No. 2,419,516, dated April 22, 1947, and 696,050, filed September 10, 1946.

It is an object of this invention to provide a number of new estrogenic compounds of very high estrogenic activity and extremely low toxicity.

It is a special object of this invention to produce certain estrogenic substances which, because of their very high estrogenic activities and extremely low toxicities, exhibit exceptionally favorable therapeutic indices and which, in addition, possess such advantageous physiological characteristics as to render them most valuable for oral administration in the treatment of the menopausal syndrome.

Other objects of this invention will be apparent from the more detailed disclosures which follow.

In its special and broader aspects, the process of this invention may be considered to involve: (A) reacting cresol or other alkylhydroxyphenyl compounds with propionyl chloride or propionic acid anhydride, thereby producing a propionate of the hydroxy compound; (B) subjecting the said propionate to the Fries rearrangement, thereby producing an alkyl-p-hydroxypropionphenone usually admixed with a quantity of the corresponding o-hydroxy compound; (C) esterifying the said mixture of alkylhydroxypropiophenones with a suitable organic esterifying reagent, and then fractionally distilling the reaction product under reduced pressure to separate the ortho and para acyloxy derivatives; (D) pinacolizing the alkyl-p-acyloxyphenone by slowly introducing water into an isopropyl ether solution of the same in the presence of amalgamated aluminum, thereby producing a 3,4-bis-(alkyl-p-acyloxyphenyl)-3,4-hexanediol; and (E) converting the hexanediol structure of the last-mentioned compound to a hexadiene structure as by dehydrating the same with a mixture of acetic acid anhydride and acetyl chloride, thereby forming a 3,4-bis-(alkyl-p-acyloxyphenyl)-2,4-hexadiene; and finally (F) hydrogenating the last compound under appropriate conditions to produce the corresponding 3,4-bis-(alkyl-p-acyloxyphenyl)hexane. In the catalytic hydrogenation of the last step

2

(F), various catalysts may be used, such as Raney nickel, where elevated temperatures and pressures are desirable, or platinum black, or palladium black, where low pressure of a few atmospheres and room temperature are preferred.

The esters of 3,4-bis-(alkyl-p-hydroxyphenyl) hexane may also be produced by saponification of a 3,4-bis-(alkyl-p-acyloxyphenyl)hexane to the corresponding 3,4 - bis-(alkyl-p-hydroxyphenyl) hexane, and then reacting either or both of the phenolic hydroxyl groups with the desired acylating reagent by various esterifying methods common to the art.

Collectively, the preferred estrogenic compounds of this invention may be referred to by the following formula:

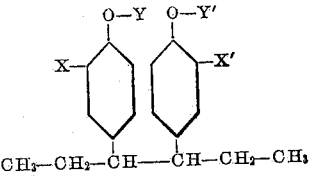

wherein X and X' are methyl groups, and at least one Y is an acyl radical derived from a saturated aliphatic carboxylic acid of 2–4 carbon atoms and the other Y is H or the same or a different acyl radical. In the simpler and more easily produced compounds, Y and Y' represent the same acyl radical. From the above formula it is obvious that the methyl groups X and X' and the acyl radicals Y and Y' may have their positions designated as 3' and 4', respectively, or as meta (m) and para (p), respectively. It will be understood that reference herein to saturated aliphatic carboxylic acid esters of 3,4-bis-(m-methyl-p-hydroxyphenyl)hexane containing 2–4 carbon atoms in the carboxylic acid radical refers to all of the types of esters included in the illustrative formula.

Example I

A. Molar quantities of o-cresol and propionyl chloride are allowed to react in a suitable container, forming, with elimination of hydrogen chloride, the o-methylphenyl propionate in quantitative yield. The reaction product may be used for the next step without further purification. (Where o-cresyl propionate is available, this step may be omitted.)

B. Thirty grams of the above crude o-methylphenyl propionate is dissolved in 100 milliliters of dry nitrobenzene and chilled in an ice bath, after which 35 grams of anhydrous aluminum chloride is added in small portions. The reaction mixture is kept cold during the addition of aluminum chloride, after which it is left standing in an ice bath for several hours and then at room temperature overnight. Thereafter, the reaction mixture is decomposed with ice water; a few milliliters of hydrochloric acid are added, and the reaction mixture is extracted with ether. The nitrobenzene-ether solution is washed with water and then extracted with 10 per cent sodium hydroxide solution. Finely crushed ice is added to this alkali solution, which is then acidified with hydrochloric acid. The precipitate formed is collected and subjected to steam distillation to remove the ortho isomer. The remaining m-methyl-p-hydroxypropionphenone may be used for the next reaction without further purification.

C. Twenty grams of the above ketone is added to 40 grams of amalgamated aluminum foil covered with one liter of moist ether and refluxed for several hours. After standing overnight the reaction mixture is filtered, and the residual magma is washed well with ether. The ether solutions are combined and concentrated by removing most of the ether, after which the residue is placed in the refrigerator for several days to allow it to solidify. The crystalline product is then collected and washed with a small portion of cold acetic acid. After recrystallization from ethanol the 3,4-bis-(m - methyl - p - hydroxyphenyl)-3,4-dihydroxyhexane melts at 182 to 183° C.

D. Five grams of the above glycol is suspended in 15 milliliters of acetic acid anhydride, and 10 milliliters of acetyl chloride is added. The flask is placed in a water bath which is gradually heated to 70° C., and heating at this temperature is continued for about twenty minutes. The flask is chilled, and the reaction mixture is treated with finely crushed ice. The precipitate obtained is recrystallized from ethanol, and then the 3,4-bis-(m - methyl-p - acetoxyphenyl)-2,4-hexadiene has a melting point of 166 to 168° C.

E. Two grams of 3,4-bis-(m-methyl-p-acetoxyphenyl)-2,4-hexadiene is dissolved in 200 milliliters of hot ethanol and subjected to hydrogenation at 70° C. and 1000 pounds per square inch pressure for two hours in the presence of a suitable catalyst, such as Raney nickel. The mixture is then filtered to remove the catalyst, and the filtrate concentrated to a volume of 50 milliliters by distilling off the ethanol. The concentrate is placed in a refrigerator overnight, and then the material crystallizing out is filtered off and dried on porous tile. The material, 3,4-bis-(m-methyl-p - acetoxyphenyl)hexane melts at 132° C. This compound produces 70 per cent estrus in ovariectomized rats when administered orally in 10 gamma doses.

Example II

A. One mol of o-cresol and 1.05 mols of propionic acid anhydride are placed in a suitable reaction vessel and refluxed for two hours. Propionic acid by-product and excess propionic acid anhydride are removed by distillation, and the residual o-cresyl propionate is used for the next step without further purification.

B. The crude o-cresyl propionate obtained in the previous step is added gradually during stirring to a solution (previously cooled to 20° C. on a cooling bath) of 1.5 mols of anhydrous aluminum chloride in 400 milliliters of dry nitrobenzene. The stirring is continued for two hours, during which time the temperature of the reaction mixture is kept between 20° and 25° C. After this time the reaction vessel is equipped with an absorption tube to prevent ingress of moisture and allowed to stand at room temperature for twenty-four hours. Then the reaction mixture is gradually poured with constant stirring into three times its volume of 1 per cent hydrochloric acid in ice water, and the water-nitrobenzene system is allowed to stand until a good separation has taken place. The nitrobenzene layer, which contains m-methyl-p-hydroxypropiophenone and m-methyl-o-hydroxypropiophenone, is drawn off, and the aqueous layer is extracted once with about one-half its volume of isopropyl ether. This ether extract is added to the nitrobenzene solution, which is then diluted with twice its volue of isopropyl ether. This solution is washed once with water and then extracted twice with an equal volume of 10 per cent sodium hydroxide solution. This alkaline solution is washed once with one-fourth its volume of isopropyl ether, cooled to about 10° C., subjected to thorough agitation, and gradually acidified with hydrochloric or sulfuric acid to Congo red. The crystalline product which thus precipitates is then filtered off, washed with distilled water until the washings are neutral to litmus, and dried.

C. The above product, consisting of approximately 80 per cent of m-methyl-p-hydroxypropiophenone and about 20 per cent of the o-hydroxy isomer, is placed in a 500 milliliter round-bottom flask provided with a reflux condenser. Then 1.05 mols of propionic acid anhydride is added, and the reaction mixture is refluxed for two hours. The material is then transferred to a suitable vacuum distilling flask and fractionally distilled. Fractions distilling below 140° C. at 21 millimeters Hg pressure are discarded. The unwanted o-propionoxy compound distills largely at 140 to 145° C. at 21 millimeters pressure, and the m-methyl-p-propionoxypropiophenone distills at 180–185° C. at the same pressure. Thus because of the wide divergency between the boiling points of the two isomers, separation is easily thoroughly effected. Melting point of the m-methyl-p-propionoxypropiophenone is 50–52° C. The yield, based on 108 grams of starting o-cresol, is at least 80 grams.

By using other acid anhydrides or acid halides, other esters of m-methyl-p-hydroxypropiophenone may be prepared and isolated in a similar manner, such as the acetic acid and butyric acid esters of special interest herein.

D. Sixty grams of oil-free aluminum foil is shaken for five minutes with 100 milliliters of 5 per cent mercuric chloride solution in a 3 liter round-bottom flask. The mercuric chloride solution is then poured off, and the aluminum foil is washed successively with water, methanol, and isopropyl ether. Immediately after the last washing, the 80 grams of m-methyl-p-propionoxypropiophenone from the preceding step, dissolved in 800 milliliters of isopropyl ether, is added to the amalgamated aluminum. The flask is then provided with a sealed stirrer, a reflux condenser, and a dropping funnel. While constantly stirring the contents of the flask, water is allowed to enter the system slowly so that the temperature of the reaction mixtures does not rise above 50° C. After 130 milliliters of water has been introduced over a period of about two hours, the stirring is continued until practically all of the amalgamated aluminum has been converted into aluminum hydroxide and mercury. About 800 milliliters of water is then added to the magma-like reaction mixture, the mass is thoroughly agitated and transferred to a separatory funnel. The upper ethereal layer is separated from the rest of the mass. The aluminum hydroxide magma is washed once with about one-fourth its volume of isopropyl ether, and the ether solutions are combined and filtered. The combined solutions are subjected to low-temperature distillation to remove the isopropyl ether. The remaining viscous oil which contains the desired compound, 3,4-bis-(m-methyl-p-propionoxyphenyl)-3,4-hexanediol, is refrigerated to allow it to crystallize, or it can be used in its oily consistency for the next step. (When permitted to crystallize and then recrystallized from ethanol, this compound has a melting point of 151–153° C.)

E. Eighty grams of the 3,4-bis-(m-methyl-p-propionoxyphenyl)-3,4-hexanediol, either in its oily consistency or in crystalline form, is placed in a 500 milliliter round-bottom flask along with 130 milliliters of acetic acid anhydride and 100 milliliters of acetyl chloride. The reaction mixture is gently refluxed for thirty minutes, allowed to cool, and then poured into twice its volume of water at 10° C. After being allowed to stand with occasional stirring for one hour, the water is decanted, and the residue is treated with 5 per cent sodium carbonate solution until the mixture is rendered permanently alkaline. The aqueous solution is discarded, after which the residue is washed twice with water. Finally the semicrystalline mass is triturated with ice cold methanol, and the resulting white crystalline material is filtered off, washed once more with cold methanol, again filtered, and allowed to dry. Upon recrystallization, the 3,4-bis-(m-methyl-p-propionoxyphenyl)-2,4-hexadiene has a melting point of 139–140° C.

F. The above 3,4-bis-(m-methyl-p-propionoxyphenyl)-2,4-dexadiene (30 grams) is dissolved in 400 milliliters of acetone and placed in the reaction chamber of a low-pressure hydrogenation apparatus. Then 0.3 gram of palladium black is added to the solution, and the reaction mixture is subjected to catalytic hydrogenation for one hour at approximately room temperature and 2 to 3 atmospheres pressure. The mixture is then filtered to remove the catalyst, and the acetone is removed by distillation. The residue is placed in a refrigerator to permit it to crystalline. [The total yield of this hydrogenation product of 3,4-bis-(m-methyl-p-propionoxyphenyl)-2,4-hexadiene, starting with 108 grams of o-cresol, is about 30 grams.]

The above white crystalline hydrogenation product contains various optical isomers of 3,4-bis-(m-methyl-p-propionoxyphenyl)hexane and when recrystallized from ethanol yields 16 to 18 grams of 3,4-bis-(m-methyl-p-propionoxyphenyl)hexane having a melting point of 114–115° C. This substance, administered orally to ovariectomized rats, produces 80 per cent estrus when given in doses of 5 gammas.

By fractional crystallization of the residue remaining in the mother liquor, other optical isomers having different melting points and different characteristics in general may be isolated.

From the above example it will be apparent that a variety of esters, such as may be preferred for the estrogenic purposes or other purposes, may be prepared by following the same techniques.

*Example III*

A. Two grams of 3,4-bis-(m-methyl-p-propionoxyphenyl)hexane is dissolved in 10 milliliters of Claisen solution and heated on the water bath until it has completely dissolved. After standing at room temperature for twenty-four hours, this solution is diluted with 40 milliliters of distilled water, filtered, and then gradually acidified with 10 per cent hydrochloric acid to Congo red. The precipitate is allowed to solidify, filtered off, washed with water, and placed on porous tile to dry. After recrystallization from 50 per cent ethanol, the 3,4-bis-(m-methyl-p-hydroxyphenyl)hexane melts at 145° C.

B. One gram of 3,4-bis-(m-methyl-p-hydroxyphenyl)hexane is dissolved in 10 milliliters of anhydrous pyridine; 2.5 milliliters of butyric anhydride is added, and the mixture is refluxed gently for two and a half hours. After cooling, the reaction mixture is treated with water, and the solid which separates after a while is collected. The 3,4 - bis - (m-methyl - p - butyroxyphenyl)hexane thus obtained is washed with water and recrystallized from methanol; the melting point is 101° C.

Employing the above 3,4-bis-(m-methyl-p-hydroxyphenyl)hexane, and by varying the molar ratios of phenolic compound and esterifying reagent, as well as using other acid halides or anhydrides, other esters, including monoesters as well as diesters, may be prepared. The mixed esters are readily produced from the monoesters.

The monoesters may also be produced from the diesters by known half-saponification methods.

We have found that the estrogenic compounds provided as examples herein can be administered orally, without observable toxic effects, in doses which exceed many times their effective estrogenic doses. The estrogenic potencies of the compounds of this invention may be readily appreciated when it is recognized that, whereas oral administration of 50 gammas of estrone produces only about 70 per cent estrus in ovariectomized rats, one of the above compounds, for example, namely 3,4-bis-(m-methyl-p-propionoxyphenyl)-hexane, produces 80 per cent estrus in ovariectomized rats when given orally in 5 gamma doses. The estrogenic potency of the compounds of this invention is further demonstrated by the results of clinical experiments which disclose that the ordinary symptoms in the average menopausal patient are markedly alleviated through the oral administration of 3 milligrams of 3,4-bis - (m-methyl-p-propionoxyphenyl)hexane per day.

It will be understood that the discussion of the estrogenic potency and the unusual freedom from toxicity of certain of the compounds of this invention is merely illustrative of the properties generally possessed by the other compounds specifically disclosed herein.

It will be understood further that the embodiments of our invention described in the specification and in the examples are only illustrative of the compounds and the processes by which they are produced. Various modifications can be made without departing from the principles of the invention or the scope of the invention which is defined in the claims.

We claim:

1. A new class of compounds, saturated monobasic unsubstituted aliphatic carboxylic acid esters of 3,4-bis-(m-methyl-p-hydroxyphenyl)-hexane containing 2–4 carbon atoms in the acyl radical.

2. A new compound, 3,4-bis-(m-methyl-p-acetoxyphenyl)hexane.

3. A new compound, 3,4-bis-(m-methyl-p-propionoxyphenyl) hexane.

4. A new compound, 3,4-bis-(m-methyl-p-butryoxyphenyl) hexane.

VICTOR NIEDERL.
ALBERT BLOOM.

REFERENCES CITED

The following references are of record in the file of this patent:

UNITED STATES PATENTS

| Number | Name | Date |
|---|---|---|
| 2,350,718 | Bretschneider et al. | June 6, 1944 |
| 2,385,852 | Turnbull | Oct. 2, 1945 |

OTHER REFERENCES

Bretschneider, Ber. Deut. Chem., vol. 74B (1941), pp. 571–588.

Certificate of Correction

Patent No. 2,500,855　　　　　　　　　　　　　　　　　　　　　　　March 14, 1950

VICTOR NIEDERL ET AL.

It is hereby certified that errors appear in the printed specification of the above numbered patent requiring correction as follows:

Column 5, line 40, for "dexadiene" read *hexadiene*; line 51, for the word "crystalline" read *crystallize*;

and that the said Letters Patent should be read with these corrections therein that the same may conform to the record of the case in the Patent Office.

Signed and sealed this 20th day of June, A. D. 1950.

[SEAL]

THOMAS F. MURPHY,
*Assistant Commissioner of Patents.*